United States Patent [19]

Portin

[11] 4,082,888

[45] Apr. 4, 1978

[54] CUSHIONED PROTECTIVE SURFACE

[76] Inventor: Henry E. Portin, 1834 N. 183rd, Seattle, Wash. 98133

[21] Appl. No.: 677,744

[22] Filed: Apr. 16, 1976

[51] Int. Cl.$^2$ .............................................. B32B 5/16
[52] U.S. Cl. ............................. 428/327; 260/29.7 R; 428/321; 404/32
[58] Field of Search ................. 260/4 R, 3, 859, 727, 260/29.7 R, 728, 729, 892, 894; 428/306, 321, 327, 320; 404/28, 82

[56] References Cited

U.S. PATENT DOCUMENTS

| | | | |
|---|---|---|---|
| 3,272,098 | 9/1966 | Buchholtz et al. | 428/327 |
| 3,663,469 | 5/1972 | Weissmahr | 260/859 |
| 3,801,421 | 4/1974 | Allen et al. | 428/315 |
| 3,816,234 | 6/1974 | Winfield | 428/327 |
| 3,978,263 | 8/1976 | Wellensiek | 428/310 |
| 4,028,288 | 6/1977 | Turner | 260/892 |

Primary Examiner—William J. Van Balen

[57] ABSTRACT

A composition which in use is applied to existing base surfaces to provide a cushioned protective surface thereon. In its preferred form, the composition comprises, by weight, approximately 60% vulcanized rubber particles, 30% latex solution, 7% water and 3% wetting solution. When applied to existing base surfaces, the composition will dry to form a cushioned, durable, protective surface to which may be conveniently added a sealing layer for weatherproofing purposes, which protective surface is then suitable for use as a sports surface, on playgrounds, or as a roofing material.

8 Claims, 3 Drawing Figures

CUSHIONED PROTECTIVE SURFACE

BACKGROUND OF THE INVENTION

This invention relates generally to the art of protective surface materials, and more particularly is concerned with a composition which, when applied to a base surface, results in a durable, cushioned protective surface for use on sports fields and surfaces, playgrounds, or as a roofing material.

Many participant-sport activites are played on a hard, non-cushioned playing surface. For instance, many running tracks are asphalt, tennis courts are typically cement or composition material, and many playgrounds are cement or asphalt. These materials, e.g., asphalt, cement, wood, etc., have the distinct advantages of durability, ease of maintenance, and tolerance of temperature extremes. However, unlike a softer, cushioned, surface as grass or mats, the hard, non-cushioned surfaces are a frequent cause of injuries, especially to children in the playground environment.

Many of the composition surfaces, such as rubberized asphalt, which are somewhat elastic and more cushioned than asphalt or cement, and hence more desirable in such circumstances, are unfortunately both expensive and difficult to apply and to maintain. For these reasons, sports surfaces which are subject to a considerable amount of hard use have typically been extremely hard and non-cushioned. Such surfaces are typically easier to maintain and are capable of withstanding heavy use. In particular sports or play environments, such as school playgrounds, the likelihood of injurious contact between the user and the playing surface is relatively high, and hence such environments have typically not been made available for use unless a softer cushioned surface, such as grass, sand or sawdust, is available. In other sports, however, such as tennis, track, and in some of the field sports such as football, the risk of injury due to a hard playing surface is not as great, although still present. In many of these applications, however, where the risk of injury is not undesirably high, a cushioned playing surface may be desirable for other reasons, namely to aid in the playing of the game, but is still not used, because the cushioned surface is not sufficiently durable, is too expensive or is unavailable for the particular use involved.

Thus, the lack of a durable, inexpensive cushioned surface suitable for use in sports or playgrounds has had a detrimental effect on both the level and quality of those activities.

There are additional uses of cushioned protective surfaces other than for sports or playgrounds. Protective surfaces are particularly needed in those environments which are susceptible to extreme temperature change or other environmental hazard. Roofing materials and/or materials used for protection of the exterior portions of buildings, residences, sidewalks, etc., are susceptible to significant stresses due to environmental abuse, or human use. Such abuse frequently leads to rapid deterioration of the protective surface, which then must be either repaired or renewed. This is particularly critical in the case of roofing materials, where deterioration is frequently rapid and where water damage may be easily sustained when cracks develop in the roofing material.

Thus, there is a significant need for a material which is practical in cost, application and maintenance and which not only acts as a durable protecting surface, but also tolerates extremes of environmental abuse, in particular, temperature change, without deterioration of its protective sealing capability.

In view of the above, it is a general object of the present invention to overcome the disadvantages of the prior art specified above.

An object of the present invention is to provide a protective surface which is cushioned.

Another object of the present invention is to provide a protective surface which may be conveniently applied over a hard non-cushioned base surface.

A further object of the present invention is to provide a protective surface which may be conveniently overlayed with a sealing layer.

It is a still further object of the present invention to provide a protective surface which is durable and able to withstand typical sports and play usage.

It is another object of the present invention to provide a protective surface which may be easily and conveniently applied in selective thicknesses on a base surface.

It is a further object of the present invention to provide a protective surface which decreases the risk of injury in sports and play activities.

It is a still further object of the present invention to provide a protective surface which is capable of withstanding significant temperature changes without signficanly deteriorating in function.

It is yet another object of the present invention to provide a protective surface which is competitive in price with presently available sports and roofing surface materials.

It is another object of the present invention to provide a protective surface which can tolerate the use of conventional track shoes thereon, and which can withstand heavy use without excessive wear.

It is a further object of the present invention to provide a protective surface which does not crack at low temperature nor become soft at high temperatures.

It is another object of the present invention to provide a protective surface which continues to provide good traction even when wet.

It is a still further object of the present invention to provide a protective surface which may be prepared as a semi-liquid remotely, and then applied to the base surface.

It is another object of the present invention to provide a protective surface which can be produced in the form of prefabricated mats and then applied in such form to a base surface.

It is a still further object of the present invention to provide a protective surface which is capable of adhering to a base surface without the use of an adhesive or other bonding agent.

Other and further objects, features and advantages of the invention will become apparent as the description proceeds.

SUMMARY OF THE INVENTION

Accordingly, the present invention is a composition which in its semi-liquid form may be conveniently applied in desired thickness to a base surface, the composition drying to form, in its solid form, a skeleton for a cushioned surface for various sports activities, playgrounds, and the like, and also for a protective surface for roofs and the like. The composition comprises in its semi-liquid form a mixture of particles made of a resiliently deformable material and a solution which contains sufficient elastic solid material that, following thorough mixture of the particles and the solution, and the subsequent change of said composition to its dry form, the particles are substantially suspended in a medium of the elastic solid material. In such a form, the particles and the medium cooperate to provide an elastic, resilient skeleton which is capable of deforming under pressure applied thereto, such as that generated by a human user walking on it, and also capable of rebounding to its original thickness when the pressure is released.

DESCRIPTION OF THE DRAWINGS

A more thorough understanding of the invention may be obtained by a study of the following detailed description taken in connection with the accompanying drawings in which.

DESCRIPTION OF THE PREFERRED EMBODIMENT

Figure 1:
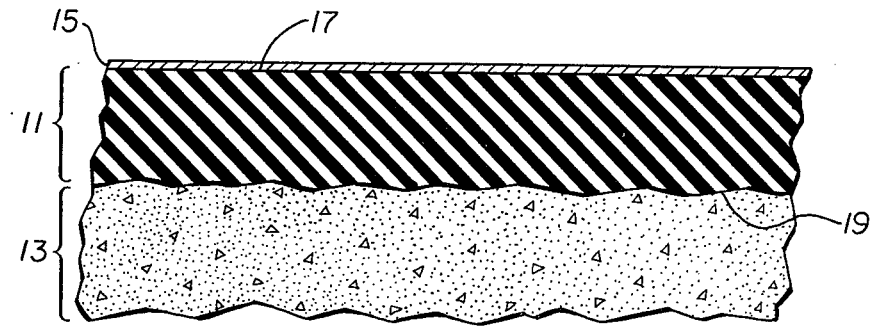
FIG. 1 is a cross-section view of a portion of the composition of the present invention in the form of a protective surface as applied on a base surface.

FIG. 1 shows a cross-section of the composition of the present invention when it has dried in the form of a protective surface layer applied on a base surface. The protective surface layer is shown at 11 in FIG. 1 and known as the skeleton, while the base surface layer, known as the base, is shown at 13 in the same figure. A sealing layer, known as the slurry, which may be applied to the upper surface 17 of protective surface layer 11 for weatherproofing and sealing purposes is shown at 15 in the same figure.

Protective surface layer 11 in its basic form is produced by mixing rubber particles with a latex rubber solution to form a composition which may then be conveniently applied in a selected thickness to base surface layer 13. The composition is then permitted to dry by exposure to the atmosphere for a prescribed length of time, and protective surface layer 11 results. Protective surface layer 11 adheres very well to base surface layer 13 without the use of adhesives while providing a durable, cushioned protective surface for use in playgrounds, sports fields, and as a roofing material. The cushioning effect, which is a result of the capacity of protective surface layer 11 to deform under pressure exerted by a user thereon, is primarily provided by the rubber particles which are held in resilient suspension by the now dried latex medium. When a user applies pressure at particular locations on upper surface 17 of protective surface layer 11 by, for instance, walking or running thereon, the rubber particles present in protective surface layer 11 gradually deform according to their natural physical capacity, providing the cushioning effect. An additional cushioning capacity of protective surface layer 11 is produced by the natural elastic quality of the latex suspension medium.

Thus, the mixture produced by a plurality of rubber particles with a solution of natural latex, will, when permitted to fully dry, result in a relatively thick cushioned protective surface being established on a base surface. The thickness of protective surface layer 11 is primarily the result of the rubber particles, held in a cooperative relationship in the elastic latex medium. The latex medium, being itself resilient, and having a structural integrity distinct from that of the rubber particles, in operation acts to partially transfer the pressure exerted by a user on the upper surface 17 of protective surface layer 11 to those rubber particles located near interface 19 between protective surface layer 11 and base surface layer 13. Thus, all of the rubber particles in protective surface layer 11 act in some proportional manner to take up the total pressure exerted on upper surface 17 of protective surface layer 11.

Not only does the elastic, resilient quality of the latex medium permit at least partial transmittal of the pressure on protective surface layer 11 to those rubber particles more deeply located therein, that is, those rubber particles located closer to interface 19 than upper surface 17, but the latex medium itself assists in taking up some of said pressure, so that in fact, there is a synergistic cooperation between the rubber particles and the latex medium to absorb said pressure. In addition, the rubber particles and the latex medium act in synergistic cooperation to rebound the protective surface layer 11 to its original physical dimensions.

When rubber particles are so suspended in an elastic latex medium, in accordance with the parameters discussed in more detail in the following paragraphs, a protective surface layer 11 is produced which is not only resiliently deformable, thus providing a significant cushioning effect for the user, but which is also sufficiently durable to withstand the normal abuse encountered by such surfaces in playground and sport environments. In addition, the elastic qualities of protective surface layer 11 permits a natural expansion and contraction thereof, in response to changes in temperature or other environmental factors without damage to the quality and/or durability of protective surface layer 11, such as cracks, similar imperfections or softening. This capacity of protective surface layer 11 to expand and contract with temperature or other environmental conditions permits its use on building, residences, and/or similar circumstances as a roofing material or in a similar protective capacity.

Protective surface layer 11 may be furthermore conveniently overlayed with a relatively-thin sealing layer 15. Sealing layer 15 may be applied by various known means directly to upper surface 17 of protective surface layer 11. Sealing layer 15 is preferably a mixture of a commercially available latex paint with a latex solution, and when applied to upper surface 17, produces a sealing layer for protective surface layer 11 against water, dust, and other environmental factors. Sealing layer 15, being also latex, will, when fully dry, also be resilient and have at least the same capacity for physical expansion and contraction as does protective surface layer 11.

Furthermore, sealing layer 15 permits protective surface layer 11 to be easily cleaned in accordance with the well-known qualities of latex paint, and additionally, because sealing layer 15 may be convenienty colored in a variety of shades, protective surface layer 11 can be easily provided with an attractive appearance. These features add to the durability of the overall protective surface and extend the range of possible applications for its use, and makes the invention particularly useful in those circumstances where a waterproof surface is essential, such as in roofing applications.

Figure 2:
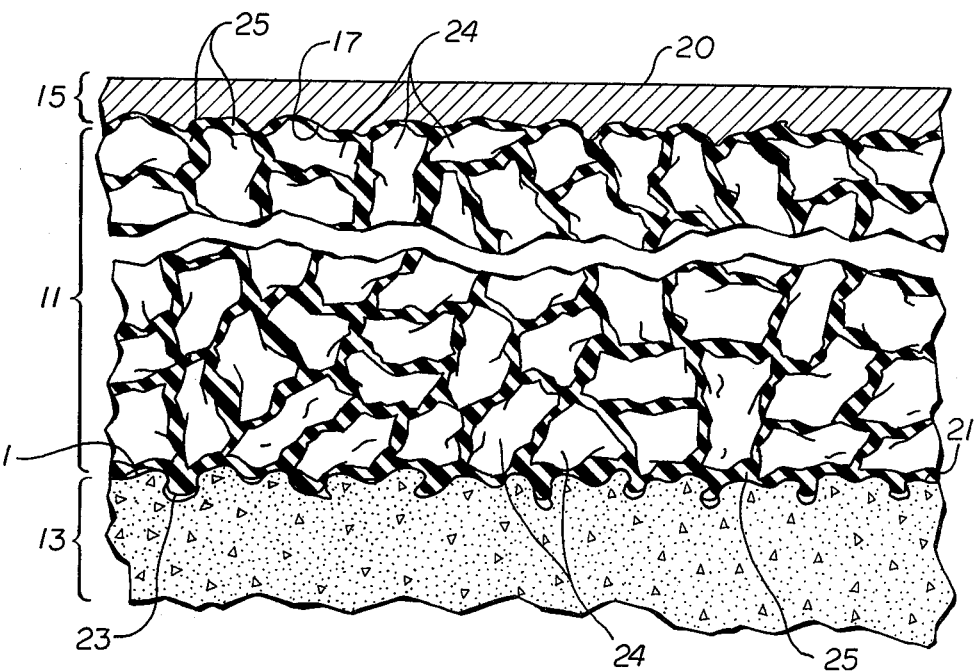
FIG. 2 is a close-up of a portion of the view of FIG. 1 showing in detail the nature of the composition, and its relationship to the base surface when applied thereon.

FIG. 2 shows more clearly the relationship between the rubber particles and the latex medium in which they are suspended when the semi-liquid composition is permitted to dry, as well as the details of the physical relationship between protective layer 11 and base surface layer 13.

In a typical application for a protective surface layer, base surface layer 13 is a compact and fairly hard, non-cushioned surface, such as asphalt, concrete, or in some cases, wood. Preferably, base surface layer 13 is not only hard, so that it provides a solid support for protective surface layer 11, but also has a somewhat irregular and/or porous upper surface 21. Conventional asphalt or concrete surfaces are excellent, as they are both sufficiently hard and, although appearing to be smooth in macro-scopic cross-section, both have minute surface undulations and imperfections, which show up in microscopic cross-section as shown in FIG. 2.

When the composition of the present invention is applied in its semi-liquid form on base surface 13, and subsequently spread and then dried to form protective surface layer 11, portions of the latex medium 25 flow into the imperfections of upper surface 21 of base surface layer 13. When protective surface layer 11 dries, the resulting intimate contact between protective surface layer 11 and base surface layer 13 provides a high degree of mutual adherence, thereby eliminating any need for a separate adhesive or bonding agent.

Even when a protective surface layer is formed by pouring and drying the composition of rubber particles and latex solution in strip form remote from the application site, the irregularities produced in the lower surface of the protective surface layer by the manufacturing process, coupled with the existing irregularities in upper surface 21 of base surface layer 13 provide, when mated, sufficient mutual friction to prevent slippage or movement of the protective surface layer under normal conditions. The mutual coefficient of friction between the two mating surfaces, that is, the lower surface of the protective surface layer and upper surface 21 of base surface layer 13, is sufficient to prevent any slippage or movement of the protective surface layer, without the need of a separate adhesive. The only circumstance in which the use of an adhesive is desirable is when base surface layer 13 has a polished upper surface 21. Under such a circumstance, the mutual friction between the mating surfaces of the protective surface layer and base surface layer 13 is not sufficient to prevent slippage of the protective surface layer. Thus, it is preferable that upper surface 21 of base surface layer 13 be non-polished, such as is the case in typical asphalt or concrete applications.

Referring again to FIG. 2, the rubber particles in protective surface layer 13 are preferably vulcanized rubber particles 24, approximately 1 millimeter in diameter. Particles 24 are typically but not necessarily irregular in shape, varying from nearly spherical to rod-like, including many variations therebetween, although most of particles 24 will have a somewhat irregular shape, similar to those shown in FIG. 2.

In the preferred embodiment, rubber particles 24 are produced by grinding discarded rubber tires into the size of particles desired. Other sources of vulcanized rubber particles can, of course, be utilized, but disgarded rubber tires, such as those from automobiles, trucks and similar sources presently serve as an inexpensive and reliable supply. The use of disgarded tires in such a manner furthermore results in the reduction of unsightly accumulations of such tires which are not otherwise usable and which are difficult and expensive to dispose of in an environmentally acceptable manner.

The essential quality of the rubber particles used in the present invention is that the material from which they are made must be resiliently deformable, that is, particles 24 must have the capability of deforming under pressure and then resiliently rebounding to their original configuration when the pressure is released. Furthermore, the material used for the particles must be such that the particles maintain their separate structural integrity in a latex medium. The particles must be maintained as particles and not dissolve or form a true solution with the latex medium.

Other materials, including certain resiliently deformable synthetics do maintain their structural integrity in a latex medium, and hence are acceptable and within the scope of the present invention. Their use, however, is not presently preferred, due to their cost, and the fact that they typically are made from petroleum products, adding expense and potential problems of non-availability.

The size of particles 24 has also been discovered to be significant to the practical functioning of the present invention. Although a diameter of one millimeter is presently preferred, with the shape of particles 24 being variable, particles 24 may vary in size to a certain extent without detrimentally affecting the desirable characteristics of protective surface layer 11. As particles 24 increase in diameter from 1 millimeter, they tend to bunch together, thereby decreasing the cushioning capability of protective surface layer 11, and the composition becomes more and more difficult to spread. Furthermore, the upper surface 17 of protective surface layer 11 becomes more and more irregular, thus making application of sealing layer 15 more difficult, and further eliminating potential applications where a relatively smooth upper surface 20 is required. As particles 24 increase much beyond 6 millimeters in diameter, the composition becomes extremely difficult to apply and spread on base surface 13, and rubber particles 24 are no longer held firmly in latex medium 25.

As particles 24 decrease in size, it becomes somewhat more difficult to obtain a thick protective surface layer, although the cushioning effect, for a given thickness, is enhanced. Generally, there has been discovered no effective lower limit for the size of particles 24, although as a practical measure, the smallest particles obtained by conventional grinding procedures are 1/10 millimeter in diameter, referred to as "rubber dust."

Thus particles 24 of protective surface layer 11 must possess certain structural characteristics, particularly a capacity for resilient deformation under pressure and a capacity to maintain its structural integrity in a latex medium. In addition, particles 24 should generally be less than 6 1 millimeters in diameter to provide the desired results for the protective surface layer. The shape of the particles are not particularly critical, although an irregular shape is generally preferred.

Referring still to FIG. 2, latex medium 25, in which particles 24 are suspended to form protective surface layer 11, is, when part of the semi-liquid composition, a solution containing preferably 55%, but no less than 40% natural latex solids. If the percentage of latex solids decreases much below 40%, the resulting solution becomes too thin, and loses its adhesive capability with respect to rubber particles 24. The resulting protective layer 11 thus breaks apart easily and hence loses many of its otherwise desirable characteristics. As the percentage of latex solids in the solution increases above 55%, the solution becomes more and more difficult to blend, and also more expensive. Furthermore, the adhesive bond between the latex solution and rubber particles 24 becomes greater and greater, until the resulting protective surface layer 11 approximates solid rubber. Generally, 70% latex solids has been found to be a reasonable upper limit, although certain desirable characteristics of the invention are still found at even higher percentages. The expense of the latex is probably the most important consideration in establishing an upper limit.

Preferably, the latex solids used in the latex solution are natural rubber latex, although synthetic latex may also be used within the spirit of the invention. Natural latex is presently preferred because it is readily available, competitively priced, and possesses the required physical characteristics to function as the medium of the protective surface layer. The medium 25 must act to hold the rubber particles 24 in suspension, individually surrounding virtually all of the particles 24. Thus, particles 24 will be separated from each other by an intermediate layer of medium 25, as shown schematically in FIG. 2. Furthermore, medium 25, when dry, must hold particles 24 firmly in place so that they will not break loose from medium 25 under normal usage.

Thus, medium 25 must adhere well to particles 24. Additionally, medium 25, when dry, must itself be elastic and resilient, so as to both transmit applied pressure throughout the entire thickness of protective surface layer 11, and to assist particles 24 in taking up the pressure. When medium 25 is capable of transmitting applied pressure, particles 24 located near the interface 19 (FIG. 1) between protective surface layer 11 and base surface layer 13 can assist in taking up the pressure applied to protective surface layer 11 as well as those particles located near upper surface 17. Since medium 25 is resilient, it also assists in taking up the applied pressure, and further permits to-fro and up-down movement of particles 24 embedded therein, without permitting those particles to break loose from medium 25, and hence, from protective surface layer 11.

These desired characteristics of medium 25, when combined with the desired characteristics of particles 24 described above, results in a synergistic increase in resiliency and resultant ability to take up pressure applied to protective surface 11 by the weight of the user while also having the capability to quickly rebound to its original physical dimensions when the pressure is released.

Medium 25 should possess all of these characteristics, and there are many materials which have these diverse capabilities, which materials would all hence be acceptable for use in the present invention. Presently, however, as explained above, a natural latex solution of approximately 55% natural latex solids is preferred. A natural latex solution having the above described characteristics and qualities is sold by the Firestone Synthetic Rubber and Latex Company as a low ammonia natural latex under the trademark "Hartex 103."

Sealing surface 15 is a mixture of an outdoor latex paint and a latex solution. Preferably the latex paint and the latex solution are mixed in equal percentages, and because the resulting slurry is relatively thin, although somewhat thicker than the latex paint alone, it may be conveniently sprayed or brushed on upper surface 17 of protective surface layer 11 to provide a sealing surface therefor. Although a slurry in the form of a mixture of outdoor latex paint with a latex solution in equal percentages is preferred, different percentage mixtures may be utilized, as well as other surface sealing materials, to provide the desired sealing results for protective surface layer 11.

Although the present invention in its semi-liquid composition form may be produced in the form of a mixture of just rubber particles and a latex solution, as described above, the preferred composition includes an additional quantity of water, and a quantity of a surface-acting agent, i.e., a wetting solution, which assists in the prompt and proper mixing of the rubber particles with the latex solution.

The inventor has discovered that the preferred composition includes the following quantities of ingredients by percentage weight: 60% rubber particles of the size and shape specified above; 30% latex solution having 55-60% latex solids; 7% water; and 3% surface-acting agent. The amount of water in the composition will be determined to an extent by the temperature of the base on which the skeleton is to be applied and its heat reflection quality. The higher the temperature and/or the greater the amount of heat reflected by the base, the greater the quantity of water which must be used in the composition.

In the preferred embodiment, when the skeleton is fully dry, medium 25 will be approximately 30-40% of the gross weight of a unit of the skeleton, with particles 24 comprising the remainder of the gross weight.

Although the preferred relationship of the rubber particles to the latex solution in the preferred composition described in the preceding paragraphs is 60-30% by weight, it has been found by the inventor that the latex solution may be considerably more than 30% and as high as 55% of the preferred composition. As the percentage portion of the latex solution increases significantly from 30%, however, the resulting composition becomes more and more paintlike and hence, it becomes more and more difficult to readily obtain the desired thickness of the skeleton. If the percentage portion of latex solution rises above 55%, it is virtually impossible to achieve any thickness for the skeleton greater than that of a layer of paint.

Correspondingly, the latex solution may be less than 30% of the preferred composition. As the percentage portion of latex solution decreases significantly from 30%, the composition becomes more and more difficult to apply and spread, and the resulting skeleton tends to bulge and produce an uneven upper surface. When the percentage portion of the latex solution decreases below 15%, the spreading of the composition becomes extremely difficult, and the resulting skeleton so uneven and irregular that the stated advantages of the present invention as a cushioned protective surface layer and roofing material are no longer realizable.

When the skeleton completely dries, the relative percentages of the medium and the particles at each extreme will be somewhat different. At the upper limit, the medium will be on the order of 61% by weight of a unit of the skeleton, while the particles will comprise the remainder, 39%, At the lower limit, the medium will comprise on the order of 17% by weight of a unit of the skeleton while the particles will comprise the remainder, 83%. As stated above, the medium will preferably comprise approximately 30-40% by weight of a unit of the skeleton, with the particles providing the remaining weight.

Thus, in order to realize the advantages of the present invention, the relative percentages of the latex solution and the rubber particles forming the composition must also be controlled, in addition to the above-described control required over the composition of the latex solution itself, and the size, shape and physical characteristics of the rubber particles.

Figure 3:
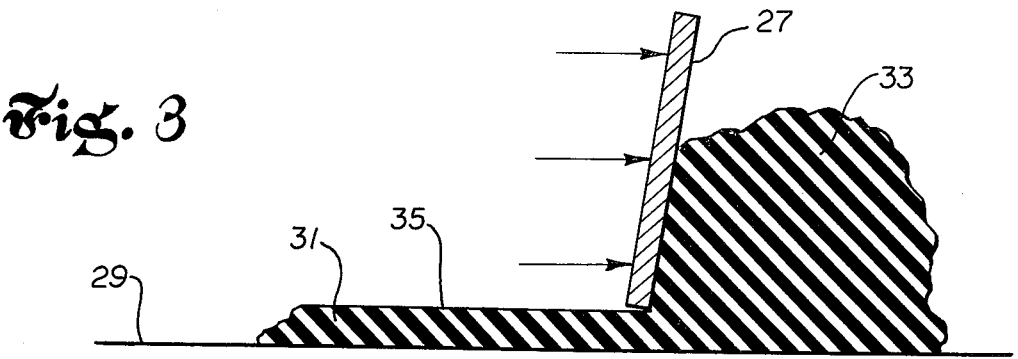
FIG. 3 is a simple schematic representation showing the manner in which the composition of the present invention is applied to a base surface to form the protective surface.

FIG. 3 shows a relatively simple schematic representation of a typical method for applying the composition of the present invention to a base surface 29 (base) to produce the desired cushioned protective surface layer 31 (skeleton). The composition as described above is first applied to base surface layer 29 in significant amounts either by pouring or spraying the composition thereon, or by some other similar known means. After application, the composition tends to settle and spread by itself, due to its semi-liquid state, and it may at this point be conveniently spread by an operator through the use of hand tools such as a trowel or a spreader 27.

In operation, spreader 27 is maintained a selected distance above base surface 29 by the operator, the selected distance being equal to the desired thickness of the protective surface layer 31, which for most applications will be approximately ¼ to ½ inch. The composition is spread evenly over base surface 29, with excess material 33 being accumulated behind spreader 27 for spreading thereof into adjacent areas, until the desired surface area is completely covered. Since the composition is semi-liquid when applied, it will continue to settle and level out even after it is spread, so as to present an even upper surface. Upper surface 35 of protective surface layer 31 may then be made even smoother by use of a hand trowel or similar known means. It should be remembered that the relative percentages of the latex solution and the rubber particles are chosen with some particularity, as described above, so that the resulting composition may be easily applied and conveniently spread, while also providing the desired thickness for the skeleton.

In practice, it has been found by the inventor that, by observing the guidelines noted above, the resulting composition may be both easily and conveniently applied to a surface, and also easily spread, using hand tools, into a desired thickness, with the protective surface layer having a uniform surface texture. After the composition has been applied and spread over the selected base surface area, the composition is permitted to dry in the atmosphere to produce a durable cushioned protective surface. The drying typically takes approximately 7 days, but may require somewhat more or less time than that, depending upon the particular environmental conditions. After the protective surface layer or skeleton is completely dried, a sealing layer may then be conveniently applied to the upper surface 35, as explained above, by known means, such as a sprayer or brush. The presence of the sealing surface provides the protective surface layer 31 with a desirable appearance and surface protection.

Thus, a cushioned protective surface is provided which, when properly applied to a base surface, has the capability of being useful as a playing surface in a variety of sports activities, including tennis, track and many others, as well as playgrounds. Such a play surface significantly reduces the risk of injury and increases participant enjoyment of those activities. Additionally, such a protective surface layer, due to its capacity for withstanding changes in temperature and other environmental conditions, is very useful in many other applications, e.g., as an exterior surface on buildings and residences, and as a roofing material.

Although a preferred embodiment of the invention has been disclosed herein for purposes of illustration, it should be understood that various changes, modifications and substitutions may be incorporated in such embodiment without deparing from the spirit of the invention as defined by the claims which follow.

What is claimed is:

1. A base surface coated with a composition comprising:
   a catalyst-free mixture of (1) particles of resiliently deformable vulcanized rubber particles between 1/10 millimeter and 6 millimeters in size, wherein said particles comprise between 55 and 65% of said mixture by weight, and (2) an aqueous latex solution comprising elastic rubber solids dissolved in water, wherein said resilient rubber solids comprise between 55 and 65% of said latex solution by weight.

2. A composition of claim 1, wherein said elastic rubber solids are natural rubber.

3. A composition of claim 2, wherein said particles are approximately 1 millimeter in diameter.

4. A composition of claim 1, wherein said mixture includes a surface-acting agent in an amount approximately 3 percent of said mixture by weight, and additional water in an amount approximately 7% of said mixture by weight.

5. A composition of claim 1, including a relatively thin water-proof sealing layer.

6. A composition of claim 1, wherein said latex solution consists essentially of elastic rubber solids dissolved in water.

7. A base surface coated with a composition consisting essentially of:
   a mixture of (1) particles of resiliently deformable vulcanized rubber particles between 1/10 millimeter and 6 millimeters in size, wherein said particles comprise between 55 and 65% of said mixture by weight, and (2) an aqueous latex solution of elastic rubber solids dissolved in water, wherein said rubber solids comprise between 55 and 65% of said latex solution by weight.

8. A composition of claim 7, wherein said elastic rubber solids are natural rubber.

* * * * *